United States Patent [19]
Lardy et al.

[11] Patent Number: 5,727,380
[45] Date of Patent: Mar. 17, 1998

[54] TURBOJET ENGINE THRUST REVERSER WITH ASYMMETRICAL DOORS

[75] Inventors: Pascal Lardy; Guy Bernard Vauchel, both of Le Havre, France

[73] Assignee: Societe Hispano-Suiza, Colombes Cedex, France

[21] Appl. No.: 677,721

[22] Filed: Jul. 8, 1996

[30] Foreign Application Priority Data

Jul. 12, 1995 [FR] France .................................. 95 08410

[51] Int. Cl.⁶ ......................................................... F02K 1/00
[52] U.S. Cl. ........................ 60/230; 60/226.2; 239/265.27
[58] Field of Search ................ 0/226.2, 230; 244/110 B; 239/265.25, 265.27, 265.29

[56] References Cited

U.S. PATENT DOCUMENTS

| | | |
|---|---|---|
| 3,097,484 | 7/1963 | Andre et al. . |
| 3,279,182 | 10/1966 | Helmintoller . |
| 3,605,411 | 9/1971 | Maison et al. . |
| 3,640,468 | 2/1972 | Searle et al. . |
| 4,410,152 | 10/1983 | Kennedy et al. ...................... 60/226.2 |
| 4,462,207 | 7/1984 | Hitchcock ................................ 60/204 |
| 4,894,985 | 1/1990 | Dubois et al. . |
| 5,230,213 | 7/1993 | Lawson ..................................... 60/230 |
| 5,284,015 | 2/1994 | Carimali et al. . |
| 5,297,387 | 3/1994 | Carimali et al. . |

FOREIGN PATENT DOCUMENTS

| | | |
|---|---|---|
| 1267850 | of 1961 | France . |
| 1482538 | of 1967 | France . |
| 2030034 | of 1970 | France . |
| 2618853 | of 1989 | France . |
| 2680547 | of 1993 | France . |
| WO 93/05291 | of 1993 | WIPO . |

*Primary Examiner*—Charles G. Freay
*Attorney, Agent, or Firm*—Bacon & Thomas

[57] ABSTRACT

A thrust reverser is disclosed for a turbofan-type turbojet engine having a cowling bounding a gas flow duct in which the thrust reverser has a plurality of thrust reverser doors each pivotally attached to the cowling so as to be movable between a forward thrust position and a reverse thrust position which redirects the gases passing through the gas flow duct outwardly from the cowling to produce a reverse thrust. At least one of the plurality of thrust reverser doors having a width, measured in a generally circumferential direction around the cowling, less than a corresponding width of at least one of the other thrust reverser doors.

6 Claims, 3 Drawing Sheets

TURBOJET ENGINE THRUST REVERSER WITH ASYMMETRICAL DOORS

BACKGROUND OF THE INVENTION

The present invention relates to a thrust reverser for a turbojet engine, more particularly a thrust reverser for a turbofan-type turbojet engine having asymmetrical thrust reverser doors.

Turbofan-type turbojet engines are well known in the art and typically comprise a fan driven at the front of the turbojet engine which directs a flow of bypass air through a duct bounded by the engine cowling and a fan cowling. The generally annular duct bounded by the engine cowling and the fan cowling may channel both the bypass flow and the primary exhaust gas flow at a downstream portion from the turbojet engine, or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

FIGS. 1 and 2 illustrate a known pivoting door-type thrust reverser associated with the fan cowling of a turbofan-type turbojet engine. As illustrated in FIG. 1, the upstream portion of the fan cowling which defines the outer limits of the bypass flow duct and which is generally concentrically arranged about the turbojet engine (not shown) is designated as 1 and generally comprises an external cowling panel 4 and an internal cowling panel 5 interconnected by a frame 6. The outer surface of the external cowling panel 4 has an aerodynamic surface over which the air external to the engine passes during aircraft flight. The inner surface of the inner cowling panel 5 defines the outer boundary of the bypass flow duct through which the bypass flow air passes in the direction of the arrow.

The fan cowling also comprises a thrust reverser, illustrated generally at 2, and a downstream fairing 3. The thrust reverser 2 comprises a door 7 pivotally attached to the cowling such that it is movable between a closed, forward thrust position, illustrated in FIG. 1, and an open, reverse thrust position in which the upstream end (towards the left as viewed in FIG. 1) of the thrust reverser door 7 is moved radially outwardly from the cowling, while a downstream portion is moved radially inwardly into the bypass flow duct airstream so as to redirect at least a portion of the bypass flow laterally through an opening in the fan cowling in a direction which has a reverse thrust component.

An actuator 7a for moving the door 7 between its forward thrust and reverse thrust positions may comprise a hydraulic cylinder extending through and mounted to the frame member 6 and having an extendible and retractable piston rod connected to the thrust reverser door 7.

The thrust reverser door 7 has an outer door panel 9 and an inner door panel 11 joined together by an internal structure. The upstream end of the door 7 may have a deflector 13 to maximize the efficiency of the thrust reverser when the door 7 is in the reverse thrust position. When the door is in the forward thrust position, as illustrated in FIG. 1, the outer door panel 9 is substantially flush with the external surfaces of the upstream panel 4 and the downstream fairing 3.

As illustrated in FIG. 2, a plurality of thrust reverser doors 7 may be incorporated into the fan cowling, such doors being circumferentially spaced around the periphery of the fan cowling. A portion 18 of the fan cowling extends axially between adjacent thrust reverser doors 7 to provide structural rigidity to the fan cowling and to provide pivot mounting points for attaching the doors 7 to the fan cowling. French Patents 1,482,538 and 2,030,034 illustrate typical, known thrust reversers.

U.S. Pat. No. 3,605,411 discloses a pivoting door-type thrust reverser in which the deflector mounted to the upstream or forward end of the thrust reverser door is movable to an extended position when the door is in the reverse thrust position.

French Patent 2,618,853 discloses a thrust reverser in which the deflector is retracted when the door is in its forward thrust position to optimize engine performance.

In some applications, as illustrated in FIG. 1, the deflectors 13 project from the inner panel of the thrust reverser door 7 even when the door is in its forward thrust position without extending into the bypass flow duct. This forms a cavity 16 facing inwardly into the bypass flow duct which will slightly degrade engine performance.

French Patent 2,680,547 discloses a thrust reverser having a combination of spoilers and deflectors to attempt to optimize the direction of exhaust flow.

In all of the known thrust reversers, the thrust reverser doors in each application all have approximately the same width (the dimension of the door measured in a direction extending around the circumference of the cowling). Thus, when the doors are in their reverse thrust positions, each directs approximately the same gas flow through each reverse thrust opening. In some aircraft applications, these known thrust reversers will direct a substantial quantity of gas flow toward an aircraft component, such as the fuselage, or wing, to possibly cause damage to that component. Attempts have been made to alleviate this problem by providing vanes or other guide means on the thrust reverser doors to direct the gases in a desired direction away from the aircraft or the ground which may cause debris to be ingested into the engine intake.

In the particular application illustrated in FIG. 2, wherein the engine is mounted on a pylon underneath an aircraft wing, the thrust reverser typically comprises four thrust reverser doors in which there are two upper doors and two lower doors. This arrangement, when in the reverse thrust mode, avoids redirecting the reverse thrust gases such that they are re-ingested into the turbojet engine. Since all of the thrust reverser doors 7 have approximately the same width, approximately half of the total gas flow is deflected by the two upper doors and approximately half of the gas flow is deflected by the two lower doors, regardless of the conventional means utilized to control the direction of the deflected gas flows. A component will be directed upwardly toward the aircraft wing upstream of the wing surface. The flow of deflected gases over the wing surface will compromise aircraft control by changing the wing lift in case the doors are prematurely opened to their thrust reversing positions during flight.

SUMMARY OF THE INVENTION

A thrust reverser is disclosed for a turbofan-type turbojet engine having a cowling bounding a gas flow duct in which the thrust reverser has a plurality of thrust reverser doors each pivotally attached to the cowling so as to be movable between a forward thrust position and a reverse thrust position which redirects the gases passing through the gas flow duct outwardly from the cowling to produce a reverse thrust. At least one of the plurality of thrust reverser doors has a width, measured in a generally circumferential direction around the cowling, less than a corresponding width of at least one of the other thrust reverser doors.

When the thrust reverser is associated with a turbofan-type turbojet engine mounted beneath the wing of an aircraft and has four thrust reverser doors circumferentially arrayed around the fan cowling, the widths of the upper doors are less than the widths of the lower doors. Additionally, the widths of one of the upper doors may be less than the width of the other upper door and the width of one of the lower thrust reverser doors may be less than the width of the other lower thrust reverser door.

By forming the thrust reverser doors of different widths, the gas flow through each of the thrust reverser openings may be accurately controlled so as to minimize the flow of thrust reverser gases over the wing surface.

DETAILED DESCRIPTION OF THE PREFERRED EMBODIMENTS

Figure 1:
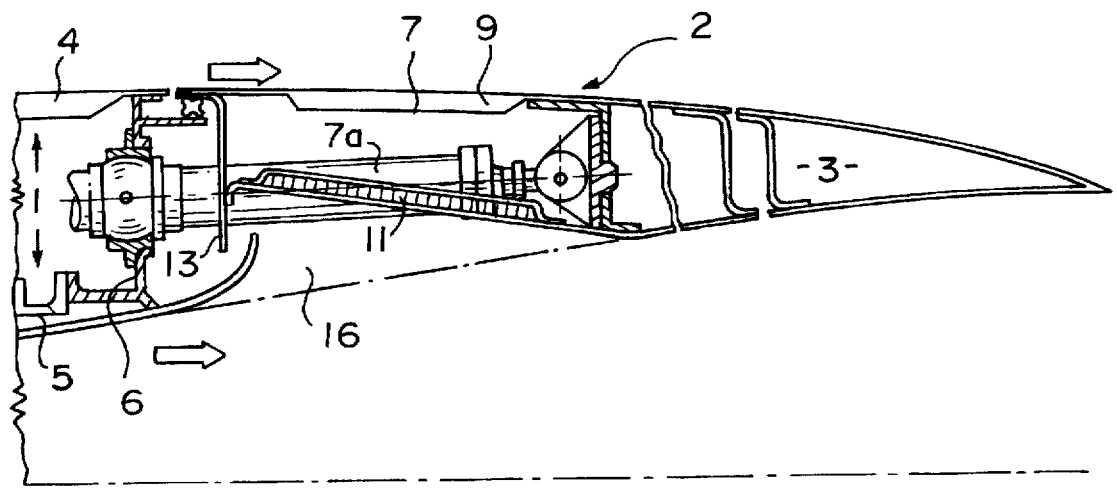
FIG. 1 is a partial, cross-sectional view of a known, pivoting door-type thrust reverser.
Figure 2:
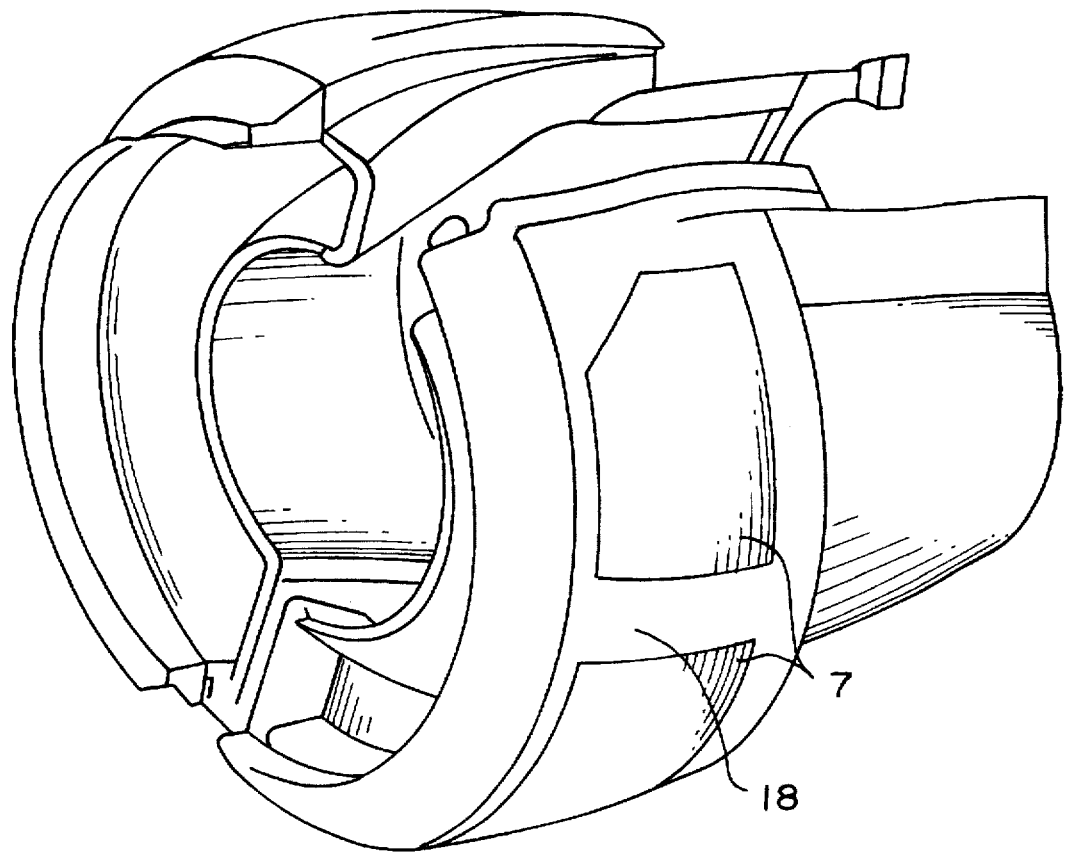
FIG. 2 is a schematic, perspective view of a turbojet engine incorporating the thrust reverser of FIG. 1.
Figure 3:
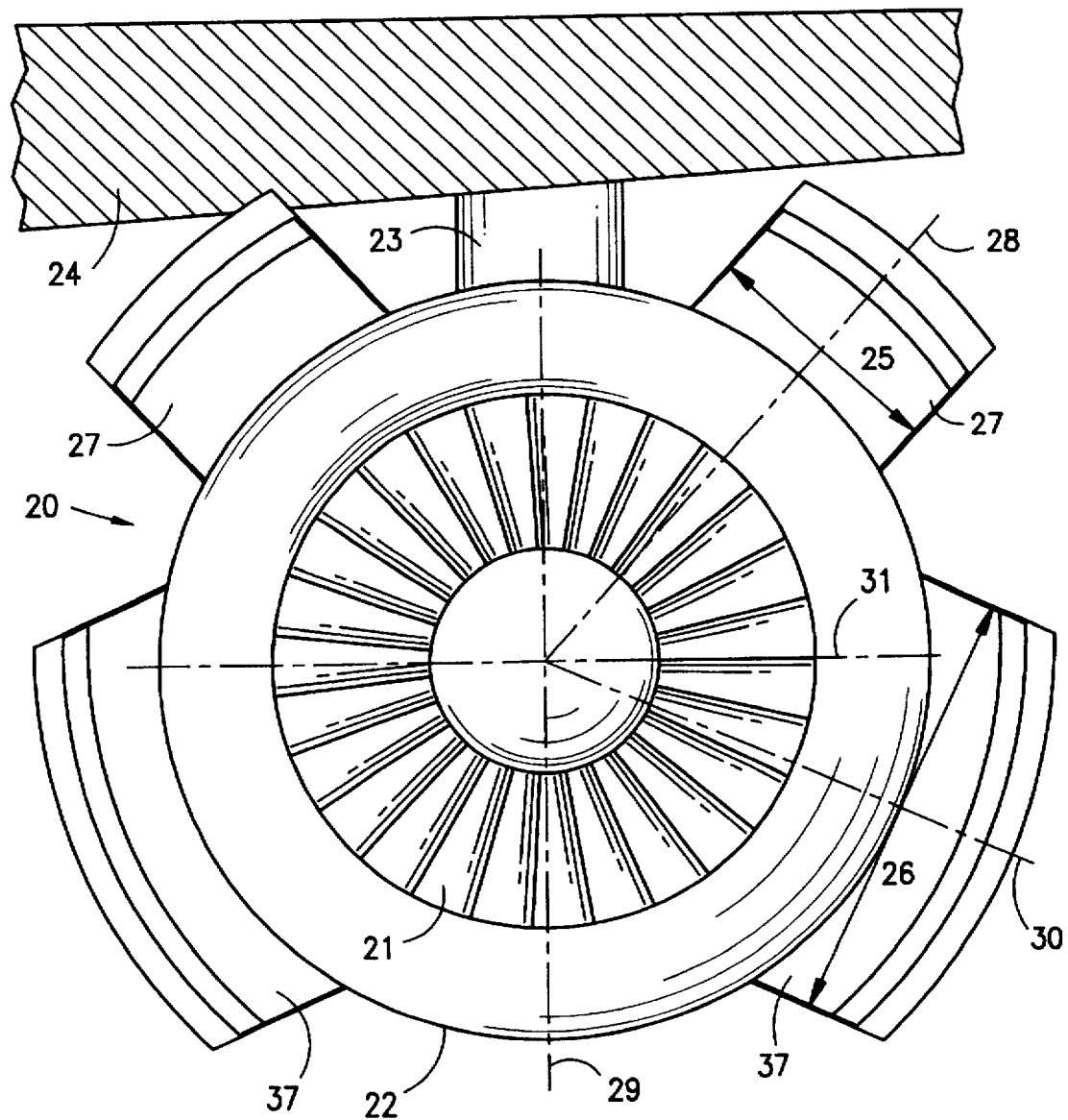
FIG. 3 is a front view of a turbojet engine incorporating a thrust reverser according to the present invention with the thrust reverser doors in their reverse thrust positions.

A first embodiment of the thrust reverser according to the present invention is illustrated in FIG. 3 wherein it can be seen that the thrust reverser comprises four pivoting doors circumferentially arrayed about the engine cowling 22 and comprising two upper doors 27 pivotally attached to an upper portion of the cowling 22 and two lower doors 37, pivotally attached to a lower portion of the cowling 22. The cowling 22 is suspended from a pylon 23 beneath the wing 24 of an aircraft (not shown). Although the invention will be explained using an example having four thrust reverser doors, the principles elucidated herein are applicable to a thrust reverser utilizing any plurality of doors.

The widths of the two upper thrust reverser doors 27, denoted by 25 in FIG. 3, is less than the widths 26 of the lower doors 37. Thus, when operating in the reverse thrust mode with the doors extended as illustrated in FIG. 3, the quantity of gas deflected upwardly by thrust reverser doors 27 is less than the quantity of gas deflected by the lower thrust reverser doors 37. This reduces the amount of deflected gas flow passing over the surface of the aircraft wing 24, thereby lessening any degradation of aircraft control, even in the event of premature or accidental movement of the thrust reverser doors to their extended positions. As can be seen, the median plane 28 of the upper thrust reverser doors 27 is oriented closer to the vertical plane 29 passing through the turbojet engine along its center line by the present design, thereby further lessening the degrading effects of the deflected gas flow.

The gas flow redirected by the lower thrust reverser doors 37 will be greater than that deflected by the upper thrust reverser doors 27. However, the performance of the engine is not effected and there is no increased danger of the deflected gases being re-ingested into the turbojet engine, since the median planes 30 extending in a direction parallel to the longitudinal axis of the engine, for each of the lower doors 37 is located closer to the horizontal plane 31 extending through the aircraft center line.

The widths 25 of the two upper thrust reverser doors 27 may be substantially equal to each other and the widths 26 of the two lower thrust reverser doors 37 may also be substantially equal to each other as illustrated in FIG. 3.

Figure 4:
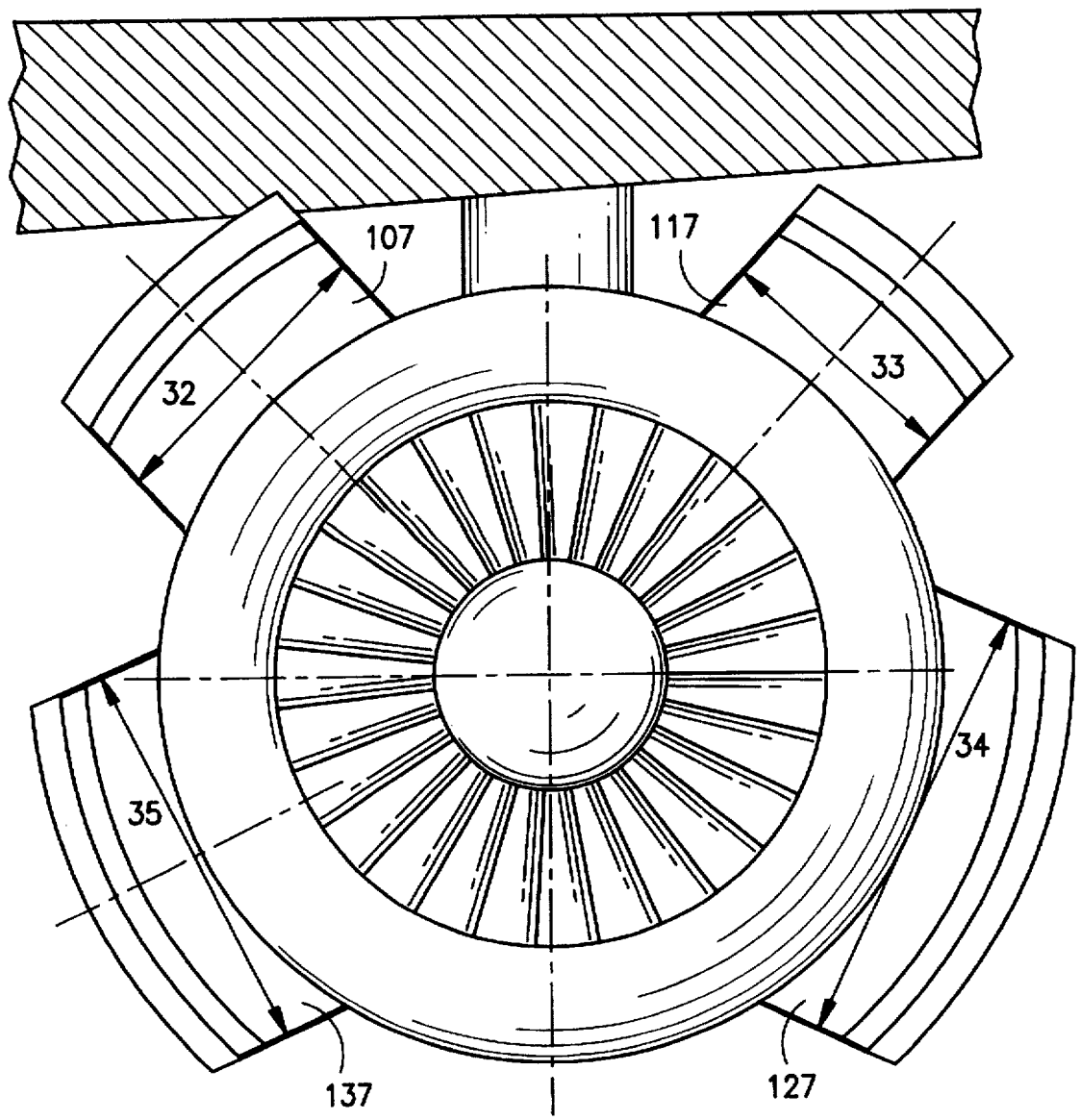
FIG. 4 is a view similar to FIG. 3 illustrating a second embodiment of the thrust reverser according to the present invention.

An alternative embodiment of the invention is illustrated in FIG. 4. In this embodiment, the widths of the respective thrust reverser doors are optimized for the purpose of improving aircraft control which may involve forming the two upper thrust reverser doors 107 and 117 with different widths 32 and 33, respectively. As can be seen, the width 33 is less than the width 32 in this particular illustration. The widths of the two lower doors 127 and 137 may also be equal to each other, or may be different as illustrated by width 35 being less than width 34. Although the widths 32 and 33 of the respective upper thrust reverser doors 107 and 117 are different from each other, both widths 32 and 33 are smaller than the widths of the lower thrust reverser doors 127 and 137.

The foregoing description is provided for illustrative purposes only and should not be construed as in any way limiting this invention, the scope of which is defined solely by the appended claims.

We claim:

1. A thrust reverser for a turbojet engine having a cowling bounding a gas flow duct comprising a plurality of thrust reverser doors, each pivotally attached to the cowling so as to be movable between a forward thrust position in which an outer surface of its thrust reverser door is substantially flush with an outer surface of the cowling, and a reverse thrust position in which a forward portion is displaced outwardly from the cowling so as to redirect at least a portion of gases passing through the gas flow duct outwardly from the cowling to produce a reverse thrust, wherein a width of at least one of the thrust reverser doors, measured in a generally circumferential direction around the cowling, is less than a width of at least one other thrust reverser door, wherein the cowling is attached to an aircraft wing and wherein the thrust reverser doors closest to the aircraft wing have a width less than the width of the remaining thrust reverser doors.

2. The thrust reverser of claim 1 wherein the thrust reverser comprises four thrust reverser doors wherein first and second thrust reverser doors are located closer to the aircraft wing than the third and fourth thrust reverser doors and have widths less than the widths of the third and fourth thrust reverser doors.

3. The thrust reverser of claim 2 wherein the width of the first thrust reverser door is substantially equal to the width of the second thrust reverser door.

4. The thrust reverser of claim 2 wherein the width of the first thrust reverser door is different than the width of the second thrust reverser door.

5. The thrust reverser of claim 2 wherein the width of the third thrust reverser door is substantially equal to the width of the fourth thrust reverser door.

6. The thrust reverser of claim 2 wherein the width of the third thrust reverser door is different than the width of the fourth thrust reverser door.

* * * * *